United States Patent
Honjo et al.

(10) Patent No.: US 9,977,542 B2
(45) Date of Patent: May 22, 2018

(54) ELECTRONIC DEVICE, CALIBRATION METHOD, AND NON-TRANSITORY COMPUTER-READABLE RECORDING MEDIUM

(71) Applicant: KYOCERA Corporation, Kyoto (JP)

(72) Inventors: Makoto Honjo, Yokohama (JP); Takayuki Fujiki, Hachioji (JP); Yuuya Yamaguchi, Yokohama (JP); Ryohei Nakamura, Yokohama (JP); Manabu Sakuma, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days. days.

(21) Appl. No.: 15/427,559

(22) Filed: Feb. 8, 2017

(65) Prior Publication Data
US 2017/0228097 A1 Aug. 10, 2017

(30) Foreign Application Priority Data
Feb. 10, 2016 (JP) .................... 2016-024124

(51) Int. Cl.
G06F 3/041 (2006.01)
G06F 3/044 (2006.01)
G06F 1/16 (2006.01)
G06F 3/02 (2006.01)

(52) U.S. Cl.
CPC ............ *G06F 3/0418* (2013.01); *G06F 1/169* (2013.01); *G06F 1/1662* (2013.01); *G06F 3/0213* (2013.01); *G06F 3/044* (2013.01)

(58) Field of Classification Search
None
See application file for complete search history.

(56) References Cited

U.S. PATENT DOCUMENTS

| 8,078,232 | B2 | 12/2011 | Higashiyama et al. |
| 8,412,281 | B2 | 4/2013 | Higashiyama et al. |
| 2009/0102818 | A1* | 4/2009 | Xu .................. G06F 1/1626 345/184 |
| 2011/0124377 | A1 | 5/2011 | Higashiyama et al. |
| 2011/0310064 | A1* | 12/2011 | Keski-Jaskari ......... G06F 3/044 345/178 |
| 2012/0046082 | A1 | 2/2012 | Higashiyama et al. |

FOREIGN PATENT DOCUMENTS

| JP | 2005-018284 A | 1/2005 |
| JP | 2008-065730 A | 3/2008 |
| JP | 2010-011085 A | 1/2010 |

OTHER PUBLICATIONS

An Office Action; "Notice of Reasons for Rejection," issued by the Japanese Patent Office dated Aug. 16, 2016, which corresponds to Japanese Patent Application No. 2016-024124; and is related to the present application; with English language Concise Explanation.

* cited by examiner

*Primary Examiner* — Joseph Haley
(74) *Attorney, Agent, or Firm* — Studebaker & Brackett PC (57) ABSTRACT

Provided is an electronic device, a calibration method, and a non-transitory computer-readable recording medium that increase user-friendliness of a touch sensor. An electronic device includes a physical key sensor which is configured to detect an operation to a pressable physical key, a touch sensor, which is disposed in vicinity of the physical key sensor, and a controller. The controller performs calibration of the touch sensor in accordance with releasing of the physical key.

6 Claims, 11 Drawing Sheets

FIG. 12

ELECTRONIC DEVICE, CALIBRATION METHOD, AND NON-TRANSITORY COMPUTER-READABLE RECORDING MEDIUM

TECHNICAL FIELD

The present disclosure relates to an electronic device, a calibration method, and a non-transitory computer-readable recording medium, especially to an electronic device including physical keys and a touch sensor, and a calibration method and a non-transitory computer-readable recording medium thereof.

BACKGROUND

As conventionally known, an electronic device, such as a mobile phone and a music player, includes pressable physical keys and a touch sensor. For example, Patent Literature 1 describes a portable electronic device including a key mat, on which ten key buttons are arranged, a key substrate, on which contacts are arranged in correspondence with the ten key buttons, and a capacitance pad, which is disposed between the key mat and the key substrate.

CITATION LIST

Patent Literature

Patent Literature 1: 2005018284A

SUMMARY

An electronic device according to one of the embodiments of this disclosure includes: a physical key sensor configured to detect an operation to a pressable physical key; a touch sensor disposed in vicinity of the physical key sensor; and a controller, wherein the controller performs calibration of the touch sensor in accordance with releasing of the physical key.

A calibration method according to one of the embodiments of this disclosure is performed by an electronic device including a physical key sensor configured to detect an operation to a pressable physical key, a touch sensor disposed in vicinity of the physical key sensor, and a controller, the calibration method including: detecting releasing of the physical key; and performing calibration of the touch sensor in accordance with releasing of the physical key.

A non-transitory computer-readable recording medium according to one of the embodiments of this disclosure includes computer program instructions, which when executed by an electronic device, which includes a physical key sensor configured to detect an operation to a pressable physical key, a touch sensor disposed in vicinity of the physical key sensor, and a controller, cause the electronic device to: detect releasing of the physical key; and perform calibration of the touch sensor in accordance with releasing of the physical key.

DETAILED DESCRIPTION

The present disclosure is to provide an electronic device, a calibration method, and a non-transitory computer-readable recording medium that increase user-friendliness of a touch sensor.

The electronic device, the calibration method, and the non-transitory computer-readable recording medium according to one of embodiments of the present disclosure increase user-friendliness of a touch sensor.

One of embodiments of the present disclosure will be described below with reference to the drawings.

Figure 1:
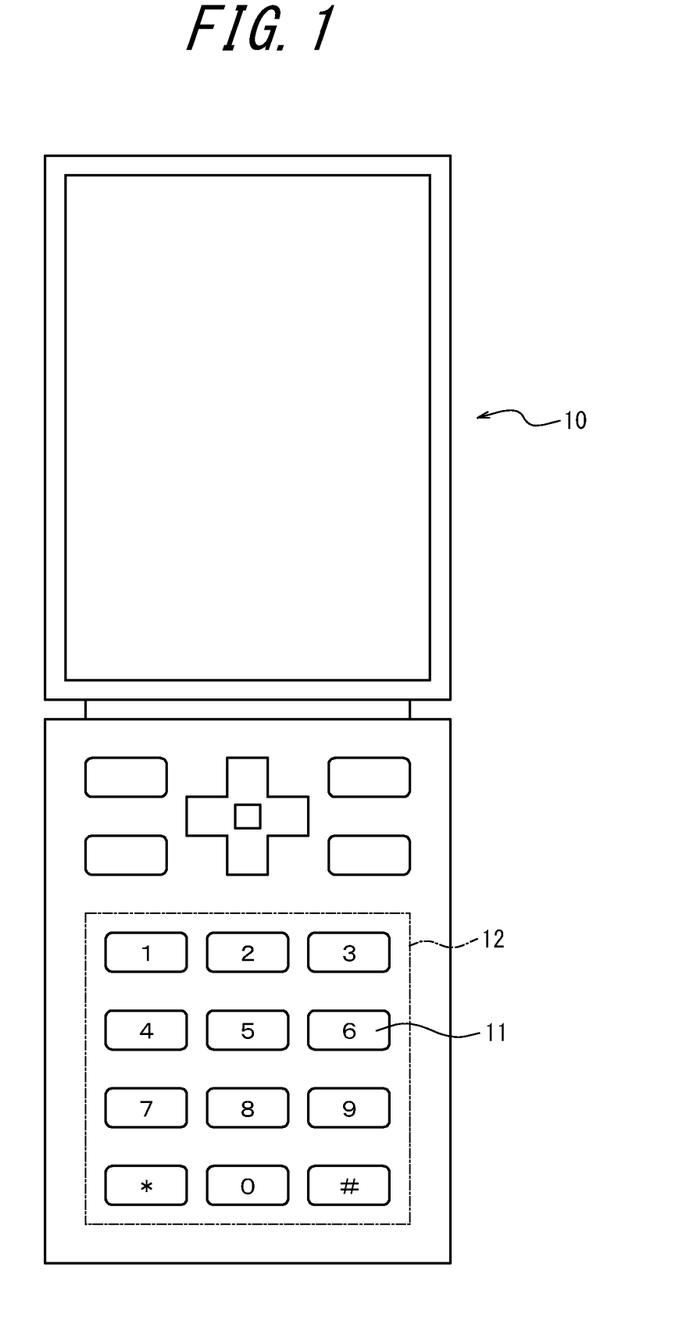
FIG. 1 is an external view of an electronic device according to one of embodiments of the present disclosure.

To start with, with reference to FIG. 1, a description is given of an electronic device 10 according to one of embodiments of the present disclosure. Although in the present embodiment the electronic device is a mobile phone, the electronic device may be any electronic device such as a music player, a smartphone, a tablet, a portable PC, a digital camera, a media player, an e-book reader, a navigator, and a game machine.

The electronic device includes one or more physical keys 11 and an operation pad 12.

Each physical key 11 is configured to be pressed in a direction (pressing direction) from a top to a bottom surface. On a surface of each physical key 11, a number, a symbol, or the like may be printed. The surface of each physical key 11 may be called a key top surface. In the present embodiment, the physical key 11 is configured to include a dielectric body such as resin. For example, relative permittivity of resin included in the physical key 11 may be one or more (e.g., approximately three). In the description below, an operation of pressing the physical key 11 is called a pressing operation, and an operation of releasing the state of pressing the physical key 11 by, for example, decreasing the pressure to the physical key 11 is called a releasing operation.

The operation pad 12 is a user interface that receives a user's operation to the electronic device with use of a projection-type capacitive touch sensor 14, which is described later. In the present embodiment, a region (represented by a dashed line in FIG. 1) on a surface (external surface) of a housing of the electronic device that surrounds the one or more physical keys 11 serves as the operation pad 12. The region serving as the operation pad includes the surfaces of the physical keys 11. According to the above configuration, the physical keys 11 and the operation pad 12 are accommodated in a small area. This configuration is preferable for a small-size device, such as a mobile phone or a portable music player.

Figure 2:
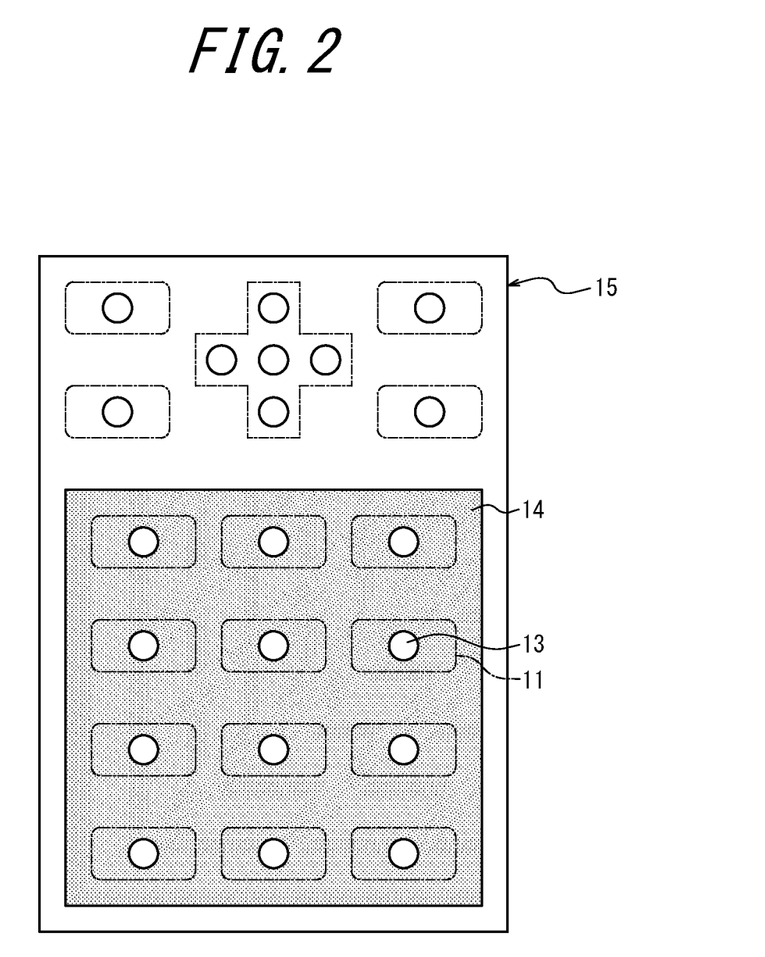
FIG. 2 illustrates physical key sensors and a touch sensor.

As illustrated in FIG. 2, for example, one or more physical key sensors 13, which may detect operations to the one or more physical keys 11 (which are each represented by a dashed line in the figure), and the touch sensor 14, which may detect an operation to the operation pad 12, are disposed inside the housing of the electronic device. For example, the one or more physical key sensors 13 and the touch sensor 14 are located above a substrate 15, which is disposed in the pressing direction from the physical keys 11 within the housing of the electronic device.

The touch sensor 14 is, for example, a projection-type capacitive sensor and disposed in the vicinity of the physical key sensors 13 (and the physical keys 11). Herein, the vicinity means that the physical key sensors 13 and the touch sensor 14 are located at a distance close enough to enable the touch sensor 14 to detect a conductor (such as a user's finger) pressing a physical key 11. In the present embodiment, as illustrated in FIG. 2, for example, the touch sensor 14 is arranged substantially adjacent to (e.g., adjacent and substantially in contact to) each of the one or more physical key sensors 13 to surround the physical key sensor 13. In other words, the touch sensor 14 is arranged on the substrate 15 except for regions in which the one or more physical key sensors 13 are arranged.

The projection-type capacitive touch sensor 14 includes a drive electrode (transmit antenna) and a receive electrode (receive antenna) and configured to detect capacitance between the drive electrode and the receive electrode. In the present embodiment, capacitance detected by the touch sensor 14 is a differential value between capacitance during calibration, which is described later, and capacitance at current time.

For example, when the conductor, such as a user's finger, approaches the touch sensor 14, capacitance detected by the touch sensor 14 increases. That is to say, the conductor approaching the touch sensor 14 has an increasing effect on capacitance detected by the touch sensor 14. On the other hand, when a physical key 11, which includes the dielectric body such as resin, is pressed to approach the touch sensor 14, capacitance detected by the touch sensor 14 decreases. That is to say, the dielectric body approaching the touch sensor 14 has a decreasing effect on capacitance detected by the touch sensor 14.

Thus, when a physical key 11 is operated, the touch sensor 14 is affected by both an object pressing the physical key 11 and the physical key 11. Regarding details of capacitance that the touch sensor 14 detects in accordance with operations to a physical key 11, a description is given later.

Subsequently, with reference to FIGS. 3A and 3B, a description is given of a positional relation between a physical key 11 and the substrate 15, on which the corresponding physical key sensor 13 and the touch sensor 14 are disposed. For the sake of convenience of illustration, FIGS. 3A and 3B omit other components, such as the housing of the electronic device and a holding member (e.g., key rubber) that holds the physical key 11 in a manner such that the physical key 11 is pressable.

Figure 3A:
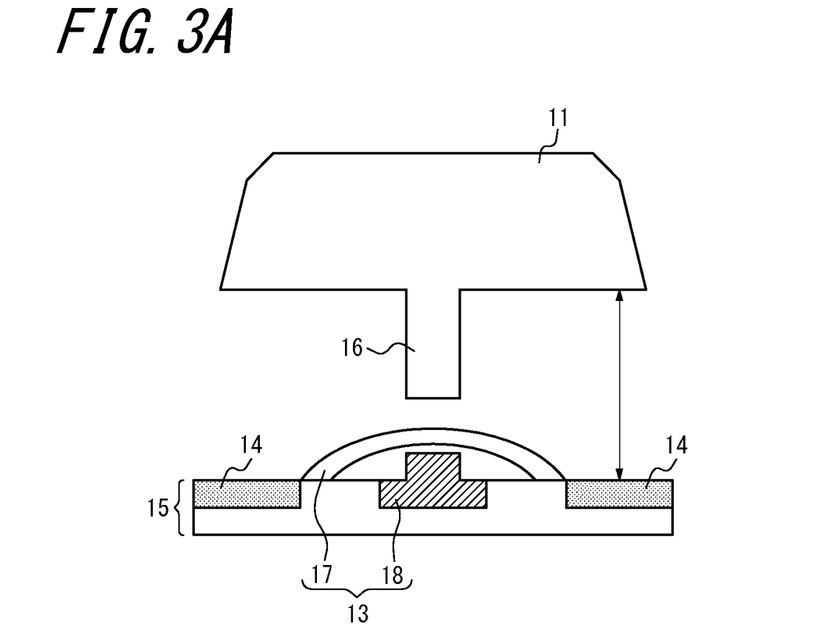
FIGS. 3A and 3B each are a sectional view of part of an electronic device taken along a plane extending along a pressing direction of a physical key.
Figure 3B:
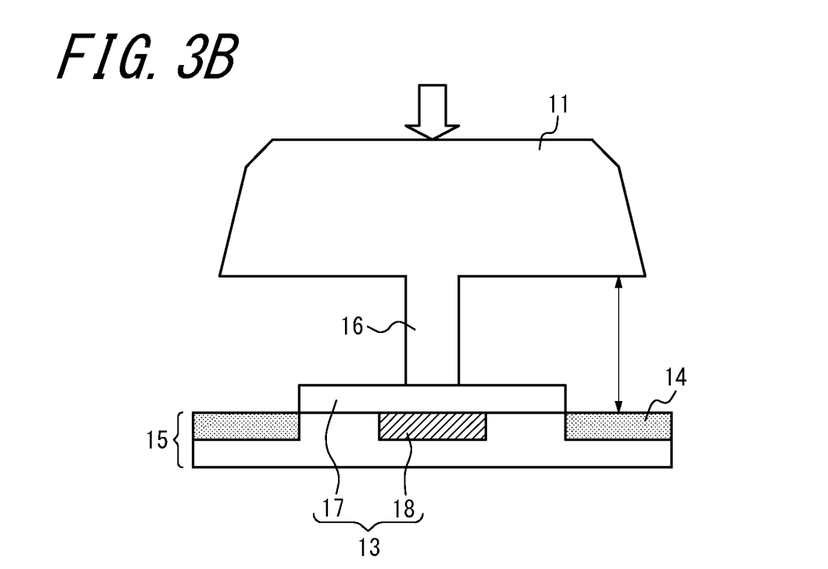

As illustrated in FIG. 3A, for example, the physical key 11 is provided integrally with a protrusion 16, which protrudes from the bottom surface. The substrate 15, on which the physical key sensor 13 and the touch sensor 14 are disposed, is disposed to oppose the bottom surface of the physical key 11 and also disposed fixedly with respect to the housing of the electronic device.

The physical key sensor 13 includes, for example, a disc spring 17 (e.g., metal dome) and a key switch 18. The touch sensor 14 is disposed substantially adjacent to the disc spring 17 on the outer side in the radial direction of the disc spring 17. Furthermore, in the present embodiment, the touch sensor 14 is located to overlap with at least part of the physical key 11 in the pressing direction of the physical key 11. In the following, a region in which the touch sensor 14 overlaps with at least part of the physical key 11 may be called an overlapped region.

FIG. 3A illustrates the state (released state) in which the physical key 11 is not pressed. In the released state, the disc spring 17 is not deformed, and the key switch 18 is OFF. On the other hand, FIG. 3B illustrates the state (pressed state) in which the physical key 11 is pressed. In the pressed state, the disc spring 17 is deformed due to load applied from the protrusion 16 provided in the physical key 11. The deformed disc spring 17 turns the key switch 18 ON. Then, once the object (e.g., a user's finger) pressing the physical key 11 is lifted from the physical key 11, the disc spring 17 undergoes elastic deformation and returns to its original state, such as the state illustrated in FIG. 3A.

Here, a description is given in detail of relations between operations to the physical key 11 and capacitance detected by the touch sensor 14. When the physical key 11 changes from the released state illustrated in FIG. 3A to the pressed state illustrated in FIG. 3B, a distance from the physical key 11 and the object pressing the physical key 11 to the touch sensor 14 is decreased. At this time, the touch sensor 14 is affected by both the physical key 11 (dielectric body) and the object pressing the physical key 11. In the following description, a reference value of capacitance detected by the touch sensor 14 is assumed to be zero.

Figure 4:
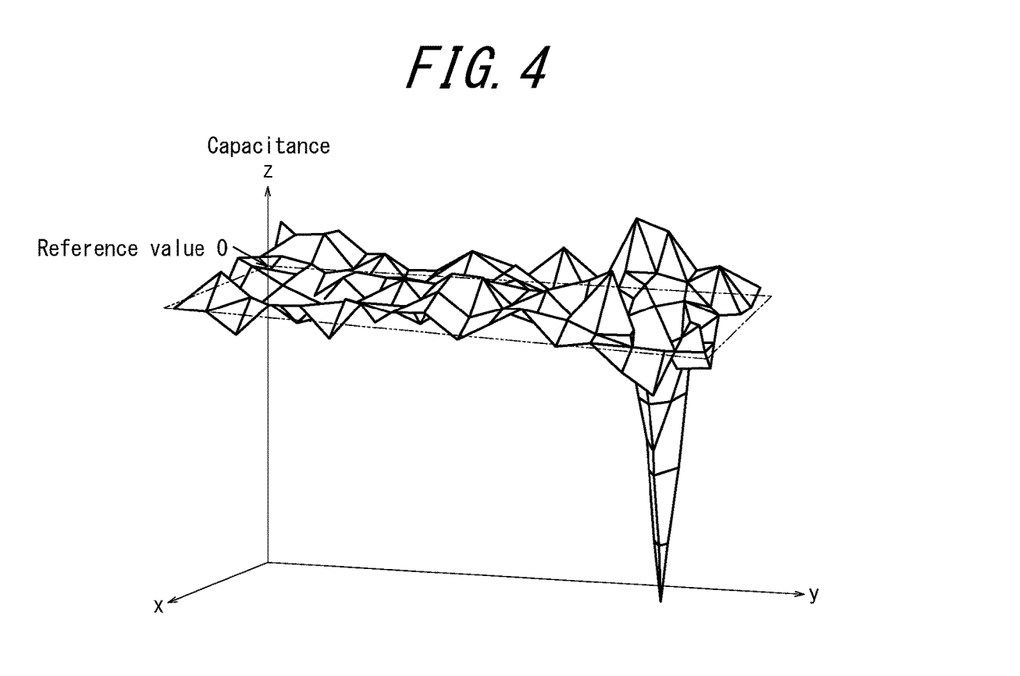
FIG. 4 illustrates an example of distribution of capacitance that a touch sensor detects when physical keys are pressed by a resin touch pen.

With reference firstly to FIG. 4, a description is given of capacitance detected by the touch sensor 14 when the physical key 11 is pressed by a dielectric body, such as a resin touch pen. FIG. 4 is a graph with the x-axis and the y-axis representing a position on the touch sensor 14 and with the z-axis representing capacitance (detected value). When the physical key 11 is pressed by the dielectric body, such as a resin touch pen, the touch sensor 14 is subject to the effect, caused by the dielectric body (the touch pen and the physical key 11), of decreasing capacitance. Accordingly, as illustrated in FIG. 4, for example, a value (negative value) of capacitance less than the reference value is detected.

Figure 5:
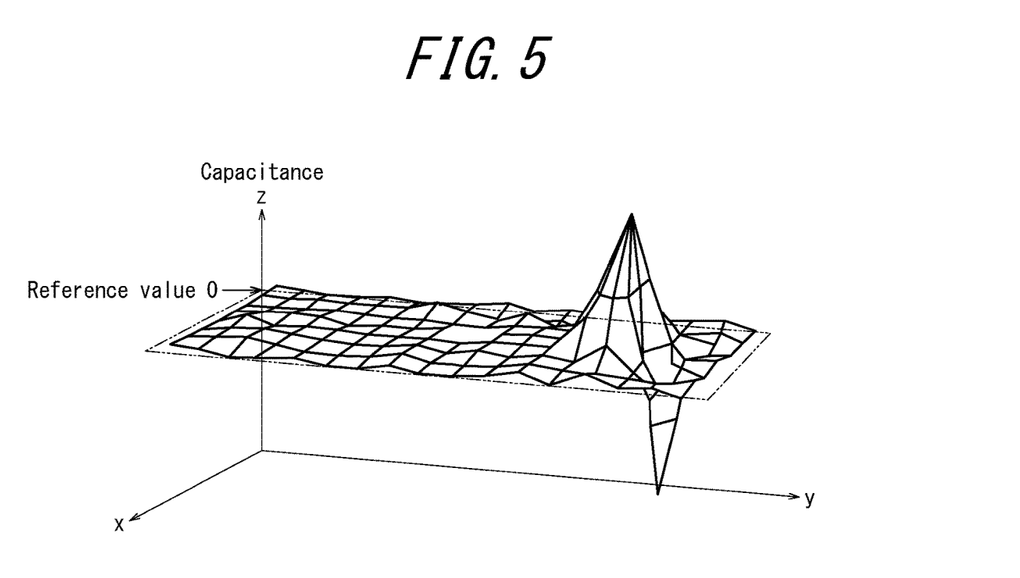
FIG. 5 illustrates an example of distribution of capacitance that a touch sensor detects when physical keys are pressed by a user's nail.

With reference secondly to FIG. 5, a description is given of capacitance detected by the touch sensor 14 when the physical key 11 is pressed by a user's nail. FIG. 5 is a graph with the x-axis and the y-axis representing a position on the touch sensor 14 and with the z-axis representing capacitance (detected value). When the physical key 11 is pressed by a user's nail, the touch sensor 14 is subject to the effect, caused by the conductor (user's finger) that is present at a distance from the physical key 11, of increasing capacitance, and touch sensor 14 is also subject to the effect, caused by the dielectric body (physical key 11) of decreasing capacitance. Accordingly, as illustrated in FIG. 5, for example, due to the effect from a user's finger that is present at a distance from the physical key 11, a value (positive value) of capacitance greater than the reference value is detected in some partial regions. Besides, due to the effect from the physical key 11, a value (negative value) of capacitance less than the reference value is detected in other partial regions.

Figure 6:
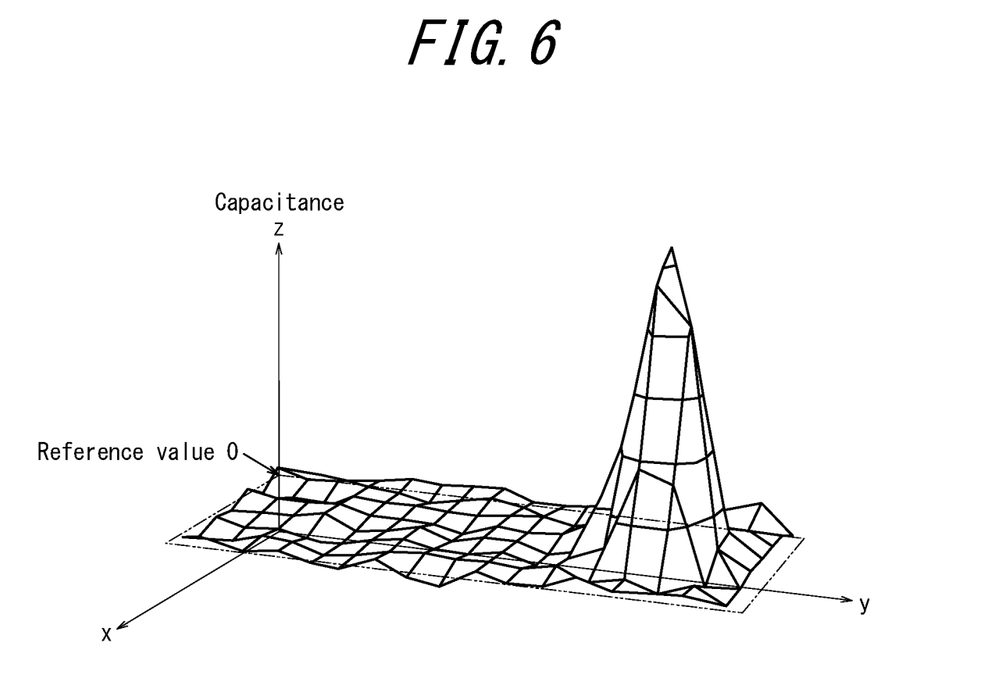
FIG. 6 illustrates an example of distribution of capacitance that a touch sensor detects when physical keys are pressed by a user's finger.

With reference thirdly to FIG. 6, a description is given of capacitance detected by the touch sensor 14 when the physical key 11 is pressed by a user's finger. FIG. 6 is a graph with the x-axis and the y-axis representing a position on the touch sensor 14 and with the z-axis representing capacitance (detected value). When the physical key 11 is pressed by a user's finger, the touch sensor 14 is subject to the effect, caused by the conductor (user's finger), of increasing capacitance, and touch sensor 14 is also subject to the effect, caused by the dielectric body (physical key 11) of decreasing capacitance. At this time, the effect by a user's finger is more dominant than the effect by the physical key 11. Accordingly, as illustrated in FIG. 6, for example, a value (positive value) of capacitance greater than the reference value is detected.

Thus, when the physical key 11 is operated by a resin touch pen or a user's nail, capacitance detected by the touch sensor 14 may be below the reference value. In the present embodiment, when capacitance detected by the touch sensor 14 is less than the reference value, as described later, calibration (automatic zero correction) of the touch sensor 14 is performed, and the currently detected capacitance is reset to the reference value.

Figure 7:
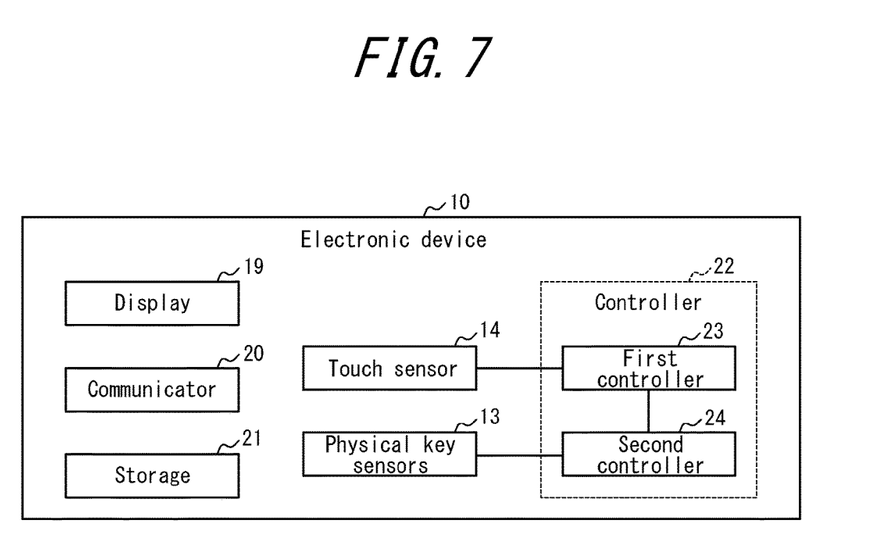
FIG. 7 is a block diagram illustrating a hardware configuration of an electronic device.

Subsequently, with reference to FIG. 7, a description is given of a schematic configuration of the electronic device. The electronic device includes the physical key sensors 13, the touch sensor 14, a display 19, a communicator 20, a storage 21, and a controller 22.

As described earlier, each physical key sensor 13 includes the disc spring 17 and the key switch 18, and the physical key sensor 13 may detect operations (the pressing and releasing operations) to the corresponding physical key 11 and states (the pressed and released states) of the physical key 11.

As described earlier, the touch sensor 14 includes the drive and receive electrodes and may detect capacitance (or a change in capacitance) between the drive and receive electrodes.

The display 19 includes a display device, such as a liquid crystal display or an EL display, and may display a variety of screens.

The communicator 20 is an interface used for wireless or wired communication.

The storage 21 includes, for example, a primary storage device and a secondary storage device and stores therein a variety of information and programs necessary for operation of the electronic device.

The controller 22 includes a first controller 23 and a second controller 24.

The first controller 23 includes at least one dedicated or general-purpose processor and executes a variety of processing regarding the touch sensor 14. The number of the processor included in the first controller 23 is not limited to one and may be more than one.

As an example, the first controller 23 acquires, from the touch sensor 14, information indicating capacitance detected by the touch sensor 14. Subsequently, based on the capacitance indicated by the acquired information, the first controller 23 performs calibration (automatic zero correction) of the touch sensor 14. In the present embodiment, when the capacitance is less than the reference value (e.g., when the capacitance is a negative value), the first controller 23 resets the currently detected capacitance to the reference value.

Supposing that the detected value of capacitance is "−10", the first controller 23 performs calibration by making a correction of increasing the detected value (by +10) so that the detected value is reset to "0". Algorithm of the calibration is not limited to the above correction, and any algorithm, which makes the detected value closer to the reference value, may be adopted.

In the description below, the calibration that the first controller 23 performs in accordance with capacitance as described above may be called a first calibration.

The second controller 24 includes at least one dedicated or general-purpose processor and executes a variety of processing regarding the physical key sensor 13. The number of the processor included in the second controller 24 is not limited to one and may be more than one.

As an example, the second controller 24 controls the first controller 23 to perform calibration of the touch sensor 14 in accordance with an operation to the physical key 11. In detail, the second controller 24 acquires, from the physical key sensor 13, information indicating operations (the pressing and releasing operations) to the corresponding physical key 11 and states (the pressed and released states) of the physical key 11 that are detected by the physical key sensor 13. Subsequently, as described later, in accordance with the acquired information, the second controller 24 outputs, to the first controller 23, a control signal to trigger calibration. The control signal to trigger calibration may include an instruction that causes the first controller 23 to perform calibration.

Alternatively, when the first controller 23 is configured to perform calibration after the touch sensor 14 is reset, the second controller 24 may output, to the first controller 23, a control signal to reset the touch sensor 14 as the control signal that causes the first controller 23 to perform calibration.

In the description below, the calibration that the first controller 23 performs in accordance with the control signal from the second controller 24 as described above may be called a second calibration.

The second calibration performed in accordance with an operation to the physical key 11 helps increase user-friendliness of the electronic device as described below, compared with cases where, for example, only the first calibration is performed. In the following, individual descriptions are given of a first configuration of the second controller 24, which supposes cases where the physical key 11 is pressed by the dielectric body, such as a resin touch pen, and a second configuration of the second controller 24, which supposes cases where the physical key 11 is pressed by the conductor, such as a user's finger.

(First Configuration)

Firstly, a description is given of the first configuration. In cases where the physical key 11 is pressed by the dielectric body, such as a resin touch pen, capacitance detected by the touch sensor 14 is less than the reference value (e.g., capacitance is a negative value). When the detected capacitance is less than the reference value, the first controller 23 performs the first calibration. Due to the first calibration performed, the detected capacitance is reset to the reference value (e.g., zero) in the state where, for example, the physical key 11 is pressed by the dielectric body.

Subsequently, once a releasing operation to the physical key 11 is performed, the physical key 11 is brought into the released state, and a distance between the dielectric body included in the physical key 11 (and the touch pen) and the touch sensor 14 is increased. Due to the effect from the dielectric body that is lift off the touch sensor 14, the detected capacitance is increased and remains a value (e.g., a positive value) greater than the reference value. This might cause malfunction in the configuration where only the first calibration is performed. That is to say, even when a user's finger is actually not in contact with the operation pad 12 (even in a non-operated state), a user's finger might be determined to be in contact with the operation pad 12 erroneously.

The second controller 24 according to the first configuration causes the first controller 23 to perform the second calibration, when releasing of the physical key 11 is detected or when a predetermined time period elapses after releasing of the physical key 11 is detected. Since the second calibration is performed after releasing of the physical key 11 in this way, capacitance detected in the non-operated state substantially equals the reference value. This prevents occurrence of the aforementioned malfunction in the non-operated state and increases user-friendliness of the electronic device.

Figure 8:
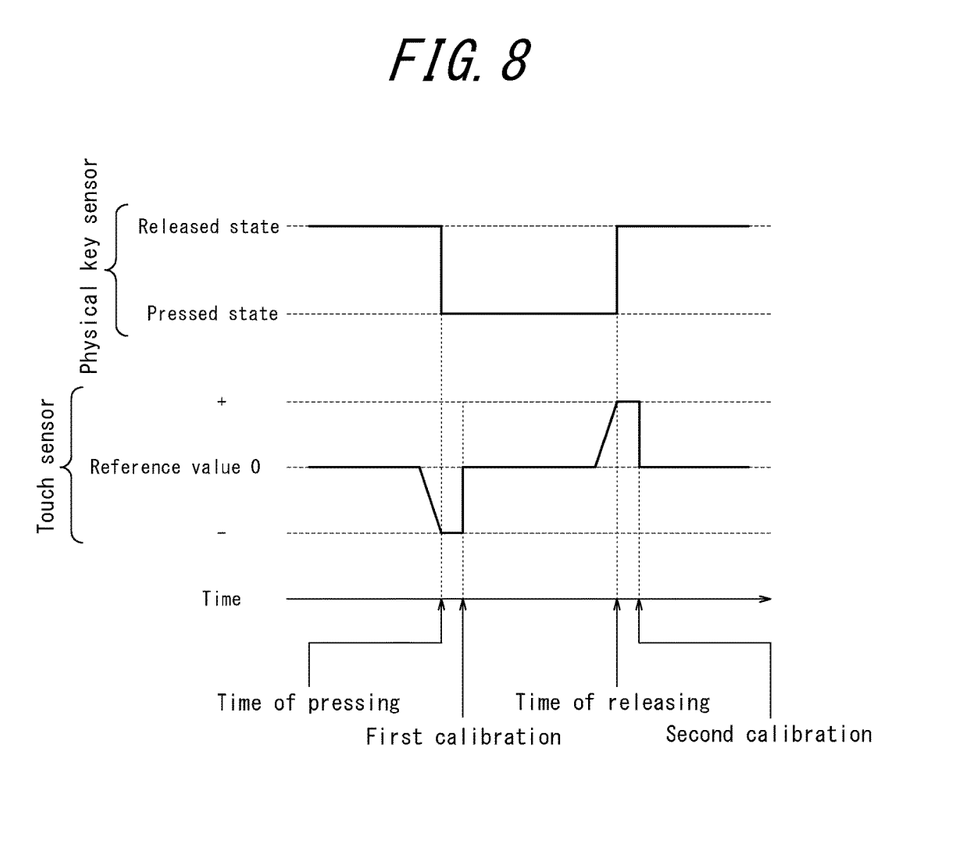
FIG. 8 illustrates how a physical key sensor and a touch sensor respond to a physical key being operated by a resin touch pen.

Here, with reference to FIG. 8, a description is given of relations between operations to the physical key 11 and capacitance detected in the aforementioned first configuration. As illustrated in FIG. 8, when the physical key 11 is pressed by the dielectric body (brought into the pressed state from the released state), the dielectric body approaches the touch sensor 14, and the detected capacitance is decreased to a negative value from the reference value (herein, zero). At this time, since the detected capacitance is a negative value, the first controller 23 performs the first calibration. The first calibration resets the capacitance, detected when the physical key 11 is in the pressed state, to the reference value.

Subsequently, once the physical key 11 is released (brought into the released state from the pressed state), the dielectric body is lifted off the touch sensor 14, and the detected capacitance is increased to a positive value from the reference value. At this time, since the physical key 11 is released, the second controller 24 causes the first controller 23 to perform the second calibration. The second calibration resets the capacitance, detected when the physical key 11 is in the released state, to the reference value.

Figure 9:
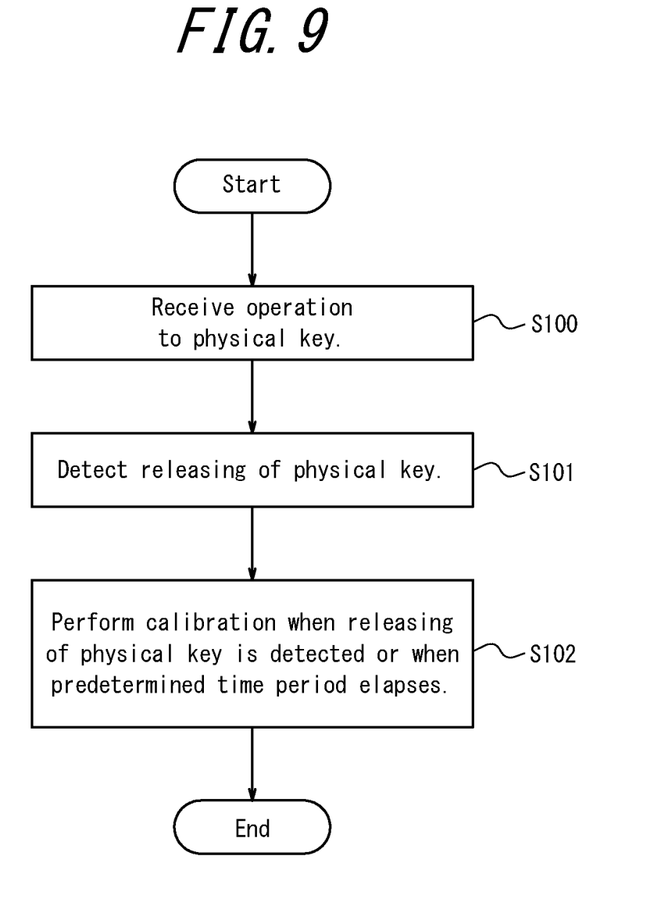
FIG. 9 is a flowchart illustrating a first operation of an electronic device.

With reference to FIG. 9, the following describes operation of the second controller 24 according to the first configuration.

Step S100: The second controller 24 firstly receives an operation to the physical key 11.

Step S101: The second controller 24 subsequently detects releasing of the physical key 11.

Step S102: The second controller 24 then causes the first controller 23 to perform the second calibration when releasing of the physical key 11 is detected or when a predetermined time period elapses after releasing of the physical key 11 is detected.

(Second Configuration)

Secondly, a description is given of the second configuration. In cases where the physical key 11 is pressed by the conductor, such as a user's finger, capacitance detected by the touch sensor 14 is greater than the reference value (e.g., capacitance is a positive value). This might cause malfunction in the configuration where the second calibration, which is described later, is not performed. That is to say, even when a user actually operates the physical key 11 (not the operation pad 12), the operation pad 12 might receive an input erroneously.

The second controller 24 according to the second configuration causes the first controller 23 to perform the second calibration, when pressing of the physical key 11 is detected or when a predetermined time period elapses after pressing of the physical key 11 is detected. Since the second calibration is performed after pressing of the physical key 11 in this way, capacitance detected in the pressed state of the physical key 11 substantially equals the reference value. This prevents occurrence of the aforementioned malfunction caused by the operation pad 12 erroneously receiving an input and accordingly, increases user-friendliness of the electronic device.

Figure 10:
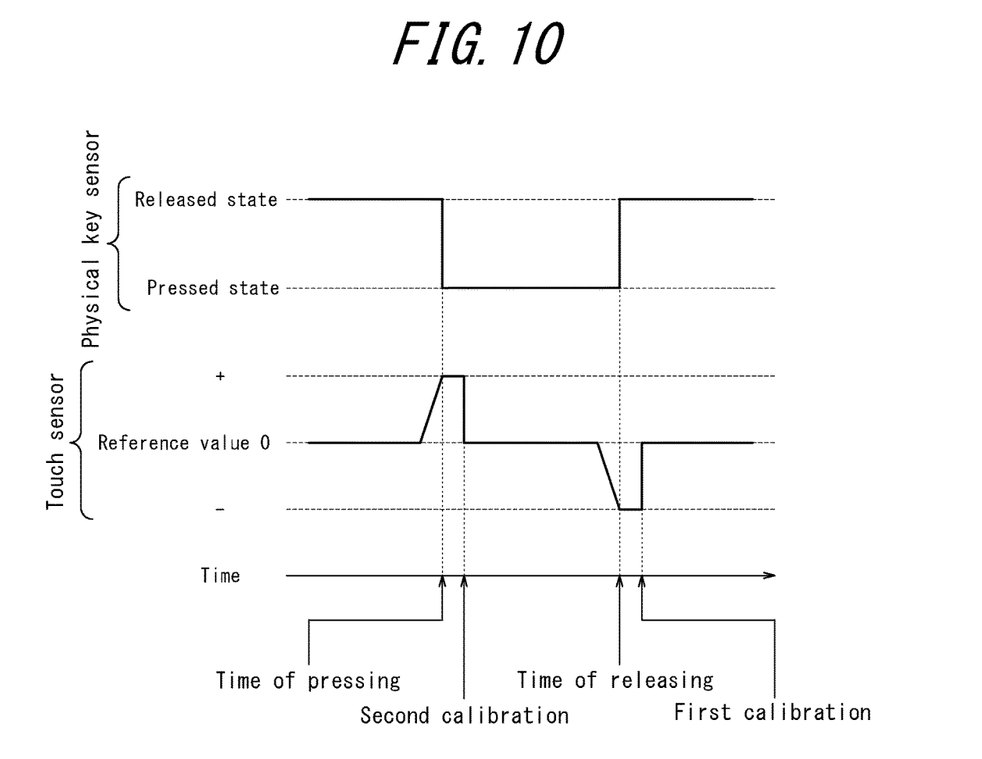
FIG. 10 illustrates how a physical key sensor and a touch sensor respond to a physical key being operated by a user's finger.

Here, with reference to FIG. 10, a description is given of relations between operations to the physical key 11 and capacitance detected in the aforementioned second configuration. As illustrated in FIG. 10, when the physical key 11 is pressed by the conductor (brought into the pressed state from the released state), the conductor approaches the touch sensor 14, and the detected capacitance is increased to a positive value from the reference value (herein, zero). At this time, since the physical key 11 is pressed, the second controller 24 causes the first controller 23 to perform the second calibration. The second calibration resets the capacitance, detected when the physical key 11 is in the pressed state, to the reference value.

Subsequently, once the physical key 11 is released (brought into the released state from the pressed state), the conductor is lifted off the touch sensor 14, and the detected capacitance is decreased to a negative value from the reference value. At this time, since the detected capacitance is a negative value, the first controller 23 performs the first calibration. The first calibration resets the capacitance, detected when the physical key 11 is in the released state, to the reference value.

Figure 11:
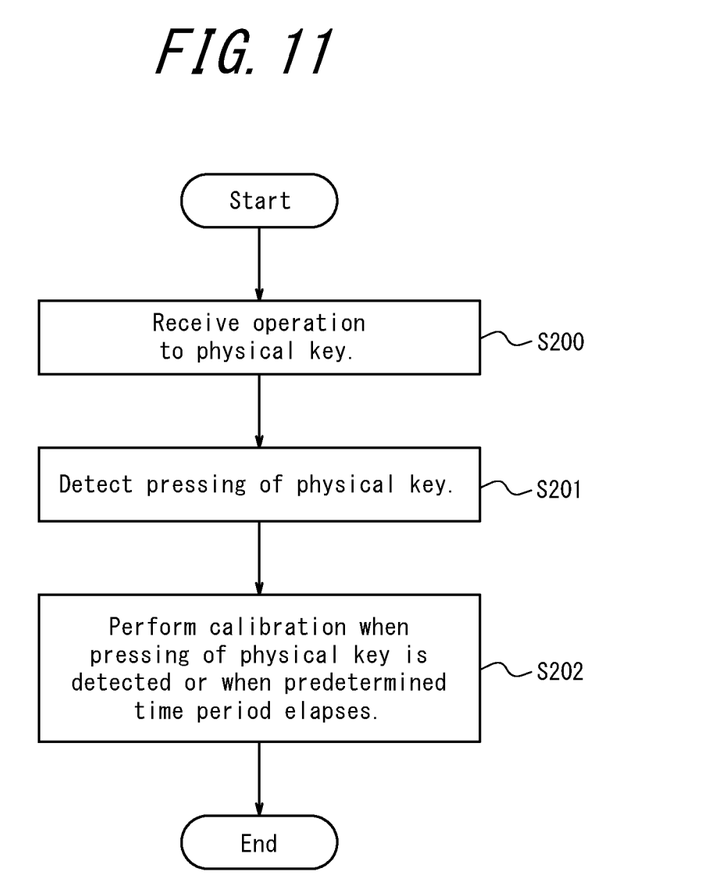
FIG. 11 is a flowchart illustrating a second operation of an electronic device.

With reference to FIG. 11, the following describes operation of the second controller 24 according to the second configuration.

Step S200: The second controller 24 firstly receives an operation to the physical key 11.

Step S201: The second controller 24 subsequently detects pressing of the physical key 11.

Step S202: The second controller 24 then causes the first controller 23 to perform the second calibration when pressing of the physical key 11 is detected or when a predetermined time period elapses after pressing of the physical key 11 is detected.

In the present embodiment, the aforementioned first and second configurations may be combined into the configuration of the second controller 24. That is to say, the second controller 24 may cause the first controller 23 to perform the second calibration both: when pressing of the physical key 11 is detected or when a predetermined time period elapses after pressing of the physical key 11 is detected; and when releasing of the physical key 11 is detected or when a predetermined time period elapses after releasing of the physical key 11 is detected.

As has been described, the electronic device according to the embodiment of the present disclosure includes the physical key sensors 13, the touch sensor 14, and the controller 22. The controller 22 performs the second calibration of the touch sensor 14 in accordance with an operation to a physical key 11. The above configuration prevents occurrence of the malfunction of the touch sensor 14 and increases user-friendliness of the electronic device.

Although the present disclosure has been described based on the drawings and the embodiment, it is to be noted that a person skilled in the art may easily make various changes and modifications according to the present disclosure. Such changes and modifications are therefore to be understood as included within the scope of the present disclosure. For example, functions and the like included in various functional units, means, and steps may be rearranged as long as the functions and the like are logically consistent. A plurality of functional units, steps, and the like may also be integrated or separated. Furthermore, the above embodiment of the present disclosure does not necessarily need to be implemented exactly as described herein, and various features of the embodiment may be combined or partly omitted for implementation as needed.

For example, when a value (positive value) of capacitance greater than the reference value is detected by the touch sensor 14 and when calibration of the touch sensor 14 is performed, the controller 22 may determine that the positive value has not occurred. In this case, by performing calibration of the touch sensor 14 in accordance with pressing of the physical key 11, the controller 22 may cancel the detection that the touch sensor 14 has made in response to the operation to the physical key 11. The electronic device adopting the above configuration may reduce, for example, erroneous processing to an icon operated by a long tap on the touch sensor on a displayed screen when a selection cursor is located above the icon.

Furthermore, although in the above embodiment the controller 22 is described to include the first controller 23 and the second controller 24, the controller 22 may be configured by a single processor serving similarly to the first controller 23 and the second controller 24. Moreover, for example, the touch sensor 14 and the first controller 23 described above may be configured as a single device.

Moreover, although in the above embodiment the second controller 24 according to the first configuration is described to cause the first controller 23 to perform the second calibration when releasing of the physical key 11 is detected or when a predetermined time period elapses after releasing of the physical key 11 is detected, the second calibration may also be performed in accordance with pressing of the physical key 11. For example, the second controller 24 may cause the first controller 23 to perform the second calibration when a predetermined time period (e.g., a time period expected to be required to bring the physical key 11 into the released state from the pressed state) elapses after pressing of the physical key 11 is detected. According to the above configuration also, it is highly probable that the second calibration is performed after the physical key 11 is released. Accordingly, similarly to the above embodiment, occurrence of the malfunction in the non-operated state is prevented, and user-friendliness of the electronic device is increased.

Moreover, although in the above embodiment the second controller 24 is described to transmit, to the first controller 23, the control signal to trigger calibration, the configuration for triggering calibration is not limited to this embodiment. For example, as a modification of the embodiment of the present disclosure, providing that the first controller 23 (and the touch sensor 14) is (are) configured to perform calibration when brought into operated (e.g., power ON) state(s) from non-operated (e.g., power OFF) state(s) (i.e., restarted), the second controller 24 may be configured to restart the first controller 23 (and the touch sensor 14).

Figure 12:
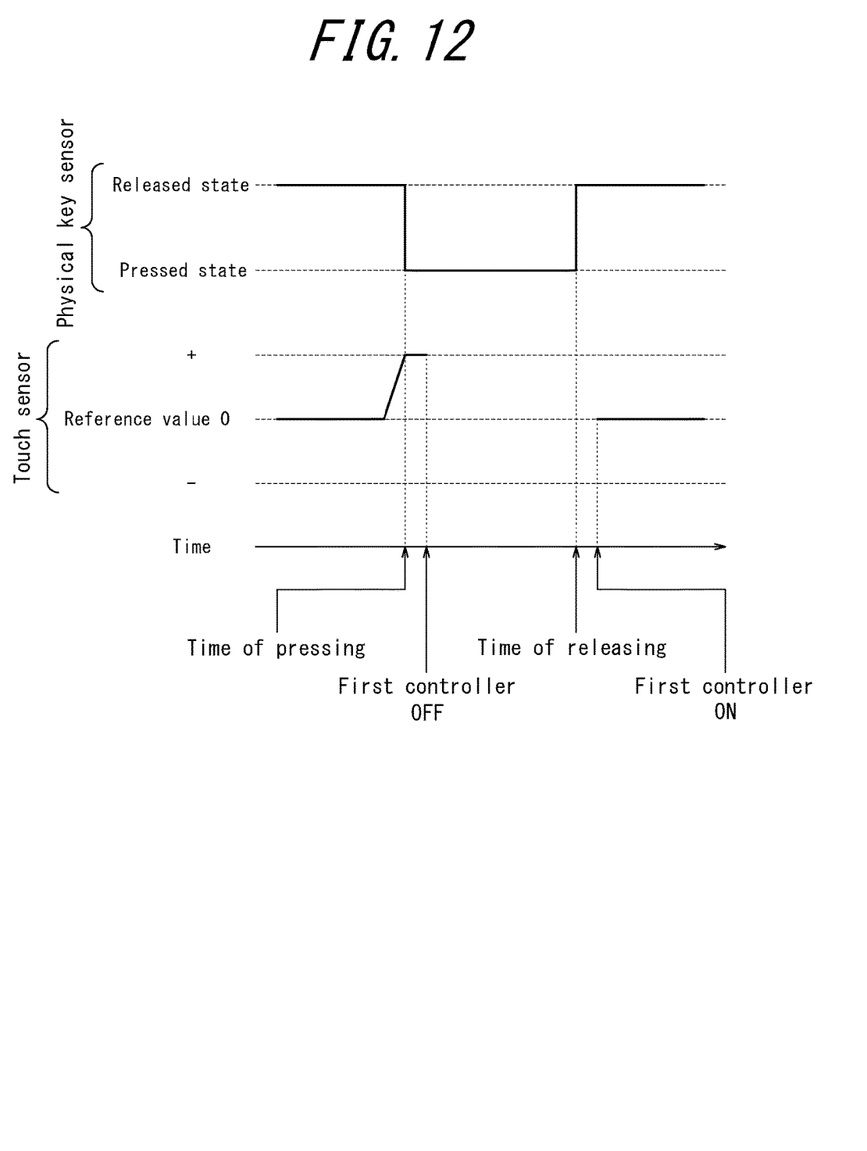
FIG. 12 illustrates how a physical key sensor and a touch sensor respond to a physical key being operated by a user's finger in a modification of the embodiment.

In the above modification, as illustrated in FIG. 12, for example, the second controller 24 turns OFF the first controller 23 (and the touch sensor 14) when pressing of the physical key 11 is detected or when a predetermined time period elapses after the detection. Then, the second controller 24 turns ON the first controller 23 (and the touch sensor 14) when releasing of the physical key 11 is detected or when a predetermined time period elapses after the detection. Alternatively, the second controller 24 turns ON the first controller 23 when a relatively long predetermined time period elapses after pressing of the physical key 11 is detected. At this time, once turned ON, the first controller 23 performs calibration, and accordingly, capacitance detected by the touch sensor 14 is reset to the reference value.

Thus, in the above modification, calibration is performed by the first controller 23 (and the touch panel) restarted by the second controller 24. Similarly to the above embodiment, the modification also increases user-friendliness of the electronic device.

The invention claimed is:

1. An electronic device comprising:
   a physical key sensor configured to detect an operation to a pressable physical key;
   a touch sensor disposed in vicinity of the physical key sensor; and
   a controller, wherein
   the controller performs calibration of the touch sensor based on the physical key sensor detecting releasing of the physical key.

2. The electronic device according to claim 1, wherein the controller performs the calibration of the touch sensor by resetting the touch sensor.

3. The electronic device according to claim 1, wherein the controller includes a first controller configured to perform control over the touch sensor and a second controller configured to perform control over the first controller,
   in accordance with releasing of the physical key, the second controller restarts the first controller, and
   when restarted, the first controller performs the calibration of the touch sensor.

4. The electronic device according to claim 1, wherein the controller performs the calibration of the touch sensor when a predetermined time period elapses after releasing of the physical key is detected.

5. A calibration method performed by an electronic device including a physical key sensor configured to detect an operation to a pressable physical key, a touch sensor disposed in vicinity of the physical key sensor, and a controller, the calibration method comprising:
   detecting releasing of the physical key; and
   performing calibration of the touch sensor based on the physical key sensor detecting releasing of the physical key.

6. A non-transitory computer-readable recording medium including computer program instructions, which when executed by an electronic device, which includes a physical key sensor configured to detect an operation to a pressable physical key, a touch sensor disposed in vicinity of the physical key sensor, and a controller, cause the electronic device to:
   detect releasing of the physical key; and
   perform calibration of the touch sensor based on the physical key sensor detecting releasing of the physical key.

* * * * *